INVENTOR.
Kenneth G. Williams
BY
ATTORNEY.
Frank D. Nieman AGENT.

INVENTOR.
Kenneth G. Williams

INVENTOR.
Kenneth G. Williams

United States Patent Office 3,407,289
Patented Oct. 22, 1968

3,407,289
ELECTRONIC DIGITAL CORRELATOR
Kenneth G. Williams, Silver Spring, Md., assignor to the United States of America as represented by the Secretary of the Navy
Filed Oct. 9, 1964, Ser. No. 402,976
5 Claims. (Cl. 235—150.5)

ABSTRACT OF THE DISCLOSURE

An electronic digital correlator for detecting wide-band signals with a low signal-to-noise ratio forming a portion of a lock-in or servo system employing two identical known pseudo-random signals with an infinite signal-to-noise ratio and a detectable signal having a very low signal-to-noise ratio. One of the pseudo-random signals is delayed a nominal amount with respect to the detectable signal, and the other pseudo-random signal is advanced the same nominal amount relative to the detectable signal. Two polarity coincidence detectors are each individually used to compare one of the pseudo-random signals with the detectable signal, and the output of each polarity coincidence detector is integrated in a binary counter. Any difference in count between the individual binary counters will cause the servo system to make corrections.

---

The invention described herein may be manufactured and used by or for the Government of the United States of America for governmental purposes without the payment of any royalties thereon or therefor.

This invention relates to a correlator and more particularly to an electronic digital correlator which is particularly useful in detecting wide-band signals with a low signal-to-noise ratio.

The prior art has utilized filters to detect signals mixed with noise, however, filters lose their value when the noise is of the same frequency as the signal and in which the signal-to-noise ratio is small. Analog correlators have also been used, but these are generally more complex and difficult to operate due to the stringent requirements placed on the power supply and the components to maintain the needed accuracy. Digital correlators have also been used in prior art devices, but these are generally more complex due to the fact that they have multipliers and integrators which integrate over a long period of time. Additionally, the devices have been more complex as they generally require an analog-to-digital converter and sometimes utilize a digital-to-analog converter.

This invention relates to the operation of a digital correlator which forms a portion of a lock-in or servo system. Input signals in analog form are converted to digital signals in binary form of one of two polarities. The information content of the signals is then represented only by the axis-crossings or polarity of the pulse as a function of time. A polarity coincidence detector in conjunction with a 1 megacycle clock signal gives a sampled output of the polarity coincidence of the input signals. A sampled output in the form of negative rectangular pulses is fed into a binary counter, which divides the pulse frequency to a lower rate. Thus the value of one point on the correlogram will be indicated in digital form at the output of the counter in terms of the number of pulses per second. This output signal is then fed to the remainder of the closed-loop servo system.

An object of the present invention is to provide apparatus for performing polarity digital correlation on analog information in the binary form by means of sampling techniques and digital integration methods.

Another object is to provide apparatus for detecting a weak signal in the presence of high noise over a wide frequency range by use of an apparatus which is more accurate in operation, simpler and less costly in construction, and highly dependable using readily available electronic components.

Other objects and advantages of this invention will become more fully apparent from the following description of the annexed drawings which illustrate a preferred embodiment, and wherein.

Figure 1:
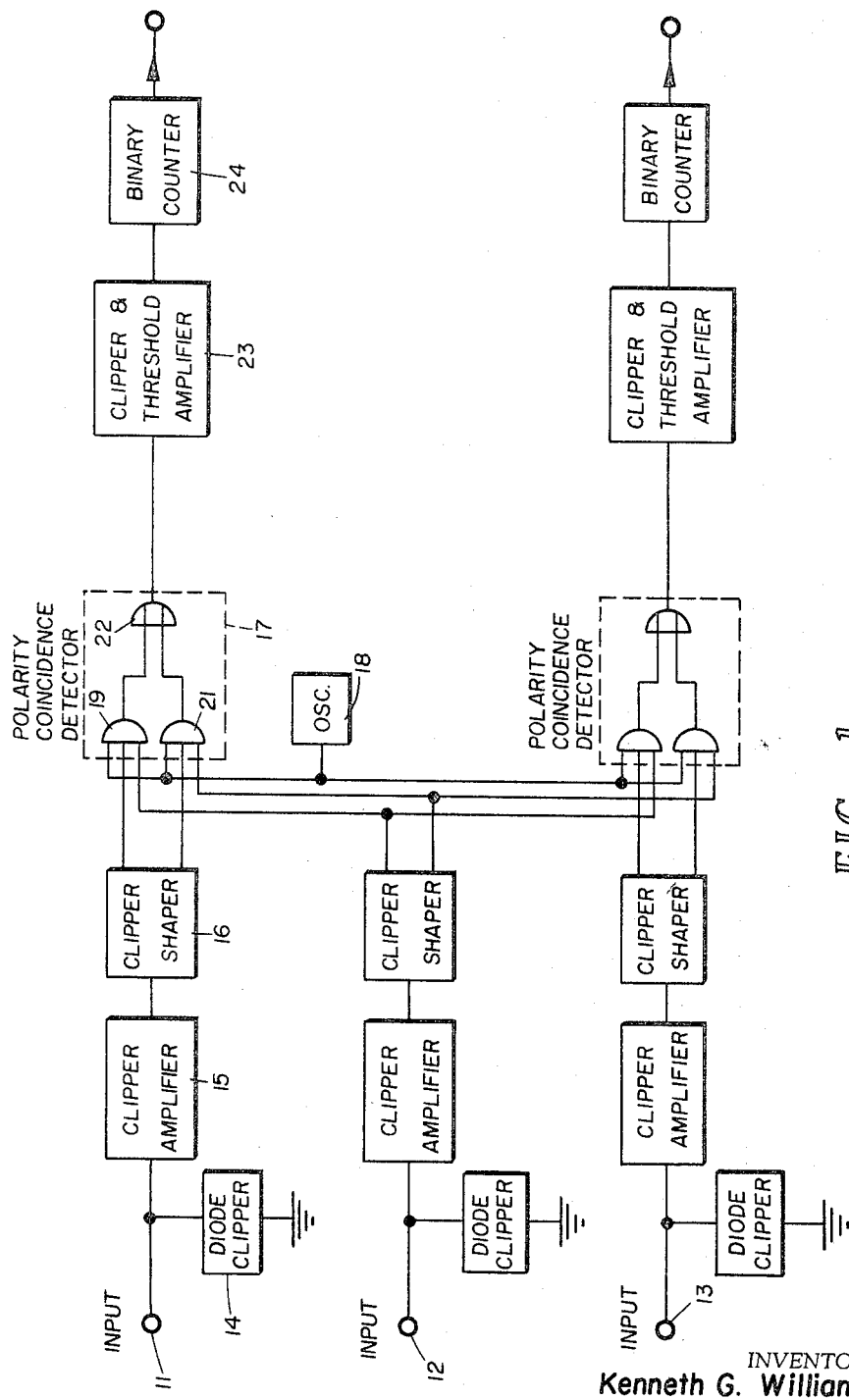
FIG. 1 is a block diagram of the system showing two complete digital correlators.

Referring to FIGURE 1, three input terminals, 11, 12, and 13, are shown for receiving different analog voltages. The two different analog voltages received on input terminals 11 and 12 are correlated in one correlator, and the input analog voltages received in terminals 12 and 13 are correlated in a second correlator. Since each of the three input analog voltages are processed through identical circuitry, the circuitry of only one input path will be described. In a similar manner, since the two correlators are identical in construction and operation only one correlator will be described. In each case it should be understood that the circuitry of the other similar circuits are identical.

Connected between the input terminal 11 and a reference potential such as ground is a diode clipper circuit 14 which clips the peaks of the input voltages on each side of the reference voltage to a predetermined maximum voltage. Only the input voltages which exceed the maximum are clipped. Also connected to receive the analog voltage from the input terminal 11 is a clipper amplifier 15 which further clips and amplifies the input signal. The output of the clipper amplifier is connected to the input of the clipper shaper 16 which further clips and shapes the input signal. The input voltage or signal which was received on input terminal 11 is a square-wave pulse of positive or negative polarity by the time it leaves the clipper shaper 16. The input analog signal, which has a octave band width of 2.5 to 5.0 kc., is now a clean rectangular pulse with sharp rise and fall times. The clipping, amplifying, and shaping circuitry is such that the axis-crossings of the digitalized output can be made to correspond with the analog axis-crossings to within 0.1 microseconds.

A polarity coincidence detector, shown generally at 17, receives polarity digitalized pulses from two inputs, terminals 11 and 12. A high frequency square wave oscillator 18, having a square-wave frequency of 1 megacycle, is a third input to the polarity coincidence detector. Contained with the polarity coincidence detector are a pair of AND gates 19 and 21 and an OR gate 22. Each AND gate receives pulses of one polarity from the two input voltages and upon the presence of a pulse from the oscillator 18 passes a pulse through OR gate 22 to the other portions of the circuitry. Thus when the polarity of the two clipped signals are identical, either both negative or both positive, the coincidence detector will allow clock pulses to be passed through OR gate 22. If the clipped signals are opposite in polarity, the clock pulses will be prohibited from passing through AND gates 19 and 21.

This action causes the coincidence detector 17 to produce a sampled output of the coincidence wave form resulting from the two true binary product of the two clipped signals. As an example, if the two input analog signals are incoherent, the two clipped signals will tend to be in agreement 50 percent of the time. Thus the output of the coincidence detector will produce an average of 500,000 pulses per second, and they will occur at random intervals if the input signals are essentially noise. Thus an average rate of 500,000 pulses per second corresponds to zero percent correlation. If the input signals are perfectly coherent, the output pulse rate would then be exactly 1 megacycle per second, corresponding to 100 percent correlation. Similarly a zero output pulse rate would represent a 100 percent negative correlation. More often, of course, the average pulse rate will lie somewhere in between these extreme values depending upon the degree of correlation of the input signals.

A clipper and threshold amplifier 23 receives the output of the polarity coincidence detector 17 and functions to terminate spurious signals. The multi-stage binary counter 24 receives the reshaped output of the clipper and threshold amplifier and counts the number of pulses received. The integration in this correlator is accomplished by the binary counter 24 which follows the coincidence detector output. The integration time is proportional to $2^n$, where $n$ is the number of stages of the counter. Since the input pulse rate is about 500,000 p.p.s. the effective integration time may be considered to be approximately $2 \times 2^n$ microseconds, which is also the average period of the output pulses. In the subject correlator, the counter has 17 stages. Output taps on each stage provide a means for varying the integration time as desired up to the maximum given by the 17 stages. The function of the counter as an integrator is to count a large sample space and then give a lower pulse rate at its output to indicate the trend of the decisions appearing at its input. Whereas a single pulse out of the coincidence detector may be either right or wrong decision, the single output pulse from the counter represents the majority opinion of a large number of pulses or decisions, 131,072 if the counter has 17 stages. Thus each counter output pulse would tend to be a correct decision.

The circuitry described thus far forms one complete correlator. In a similar manner the input analog voltage received on terminals 12 and 13 is correlated in the other correlator shown in FIGURE 1. These two correlators are needed to operate the digital lock-in servo system for which this invention was made. The signals for inputs 11 and 13 are identical pseudo-random signals with an infinite signal-to-noise ratio. One of these signals is delayed a nominal amount with respect to the signal portion of the input signal received on terminal 12. The other signal on terminal 13 is advanced the same nominal amount relative to input terminal 12. The signal received on input terminal 12 is a signal having very low signal-to-noise ratio. The values of the correlation function generated by the two coincidence detectors will be identical; if the correlation function is symmetrical about zero delay, and if the advance and delay times are the same. The derivatives of the correlation function at these identical delays have opposite signs so that when the two delays are not quite equal, there will be a difference in the average pulse rate from the two coincidence detectors. It is this difference in rate which causes the servo system to make corrections.

Figure 2:
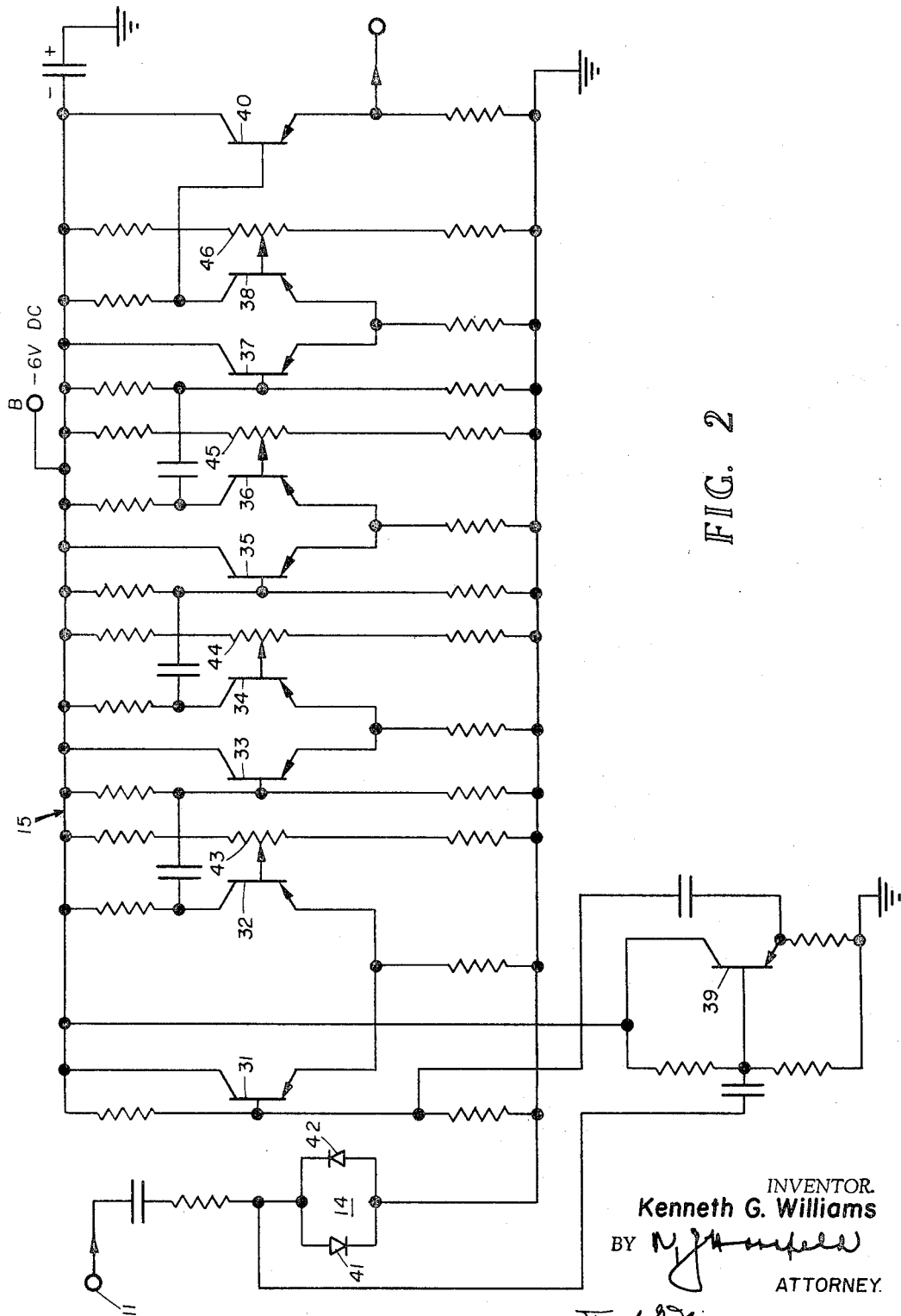
FIG. 2 is a circuit diagram of a typical clipper amplifier and diode clipper utilized in the invention.

FIGURE 2 illustrates the input terminal 11, the diode clipper 14 and the clipper amplifier 15. Four emitter-coupled amplifier stages in cascade are shown to perform the clipping action of the input analog signals. These stages are made up of the pairs of transistors 31–32, 33–34, 35–36, and 37–38. This type of amplifier produces a clean rectangular and symmetrical slipping action. It also has no tendency toward overload distortion with large input signals until the peak-to-peak amplitude exceeds the available B-supply. An emitter-follower 39 at the input provides a relatively high input impedance, while another emitter-follower 40 is used at the output to give a low output impedance. A sinusoidal signal of a few millivolts RMS at the input will begin to show a clipped signal at the output. A 10 millivolt signal will produce a good square wave at the output. To prevent extremely large signals from reaching the first emitter-coupled stage, a diode clipper having diodes 41 and 42, is employed ahead of the emitter-follower. Since these are silicon diodes, they start conducting when their forward potential reaches approximately 0.5 volt. Connected back-to-back as shown, they prevent any signal larger than 1 volt peak-to-peak from appearing at the input of the first stage. The clipped output signal of the amplifier will have a constant peak-to-peak value of about 3 volts for a 6 volt B-supply and for any input signal from 5 millivolts to 50 volts RMS. Adjustable trim potentiometers 43–46 are provided on each emitter-coupled amplifier to adjust symmetry of the output wave form.

Figure 3:
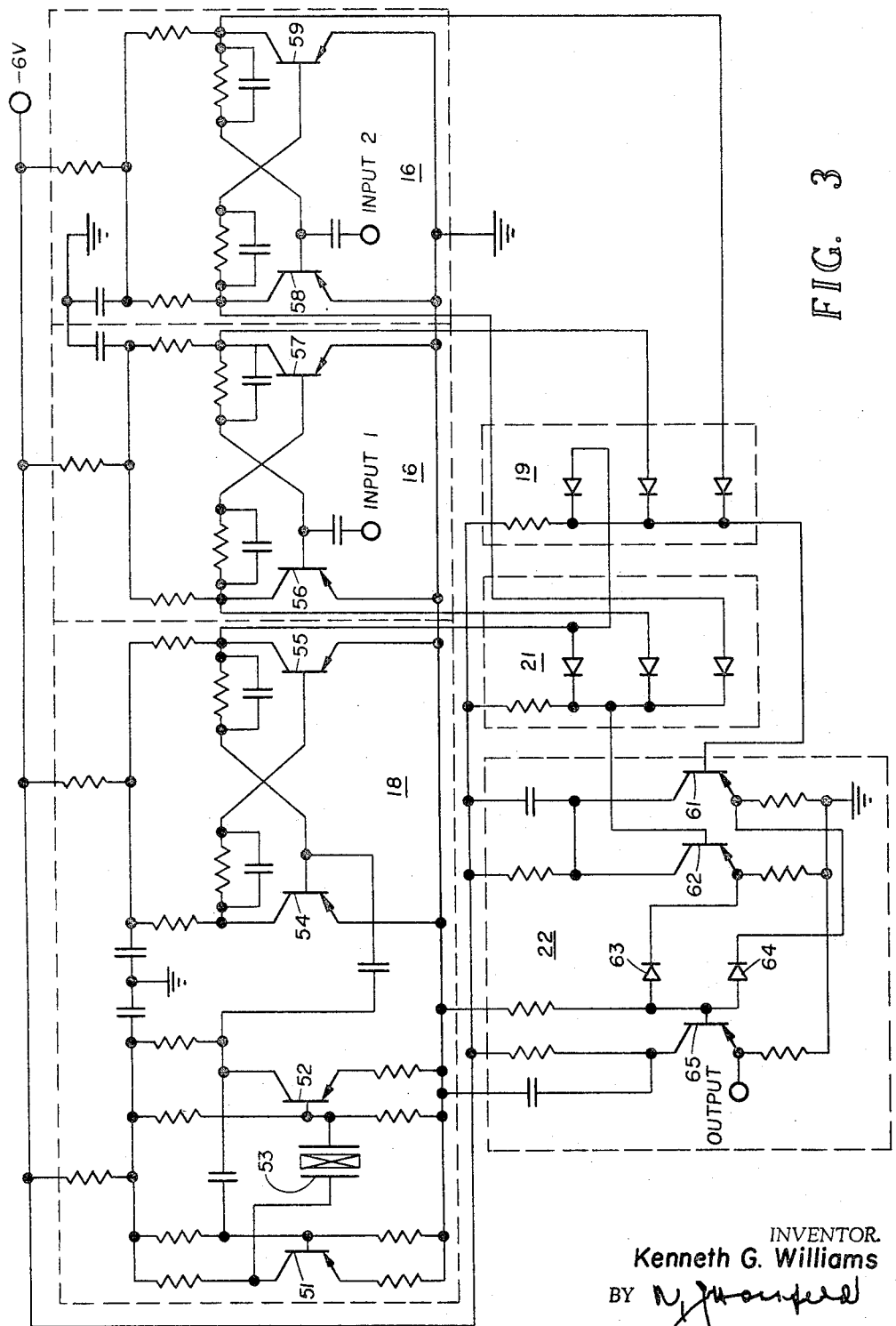
FIG. 3 is a circuit diagram showing the oscillator, a typical clipper shaper, and a typical polarity coincidence detector.

The circuit diagram of FIGURE 3 shows the one megacycle crystal clock oscillator 18 and the polarity coincidence detector. The oscillator is a type multivibrator circuit formed by transistors 51 and 52. A 1 megacycle quartz crystal 53 is used as a negative feedback element to provide a high degree of frequency stability to the circuit. A flip-flop shaper composed of transistors 54 and 55 serves to square the oscillator output as well as act as a buffer stage for the oscillator. Two more identical shapers composed of transistors 56 through 59 act to improve the output wave forms of the two clipper amplifiers. A rise in fall time of the rectangular signals from the shapers are extremely rapid being on the order of 30 nanoseconds. Each polarity coincidence detector 17 or diode detector contains two AND circuits, 19 and 21, of three diodes each. Each AND circuit provides a negative output pulse when its three input pulses inputs are negative. The two AND circuits are supplied from the opposite phases of the input signal shaper flip-flops so that one produces a negative output when positive signal coincidence occurs and the other gives a similar negative output for negative coincidence. The output of the two AND circuits are added together in an OR circuit 22 to produce a negative pulse whenever either AND circuit indicated input signal polarity agreement. The OR circuits are each composed of two emitter-followers 61 and 62 and two diodes 63 and 64 connected to their outputs. The polarity coincidence detector used here is essentially a sampling circuit since its output supplies a series of one megacycle clock oscillator pulses when the inputs are in agreement and no output pulses when the inputs are in disagreement. The emitter-follower 65 provides a low output impedance for each of the polarity coincidence detectors. The outputs drive the two binary counters which act as integrators.

Figure 4:
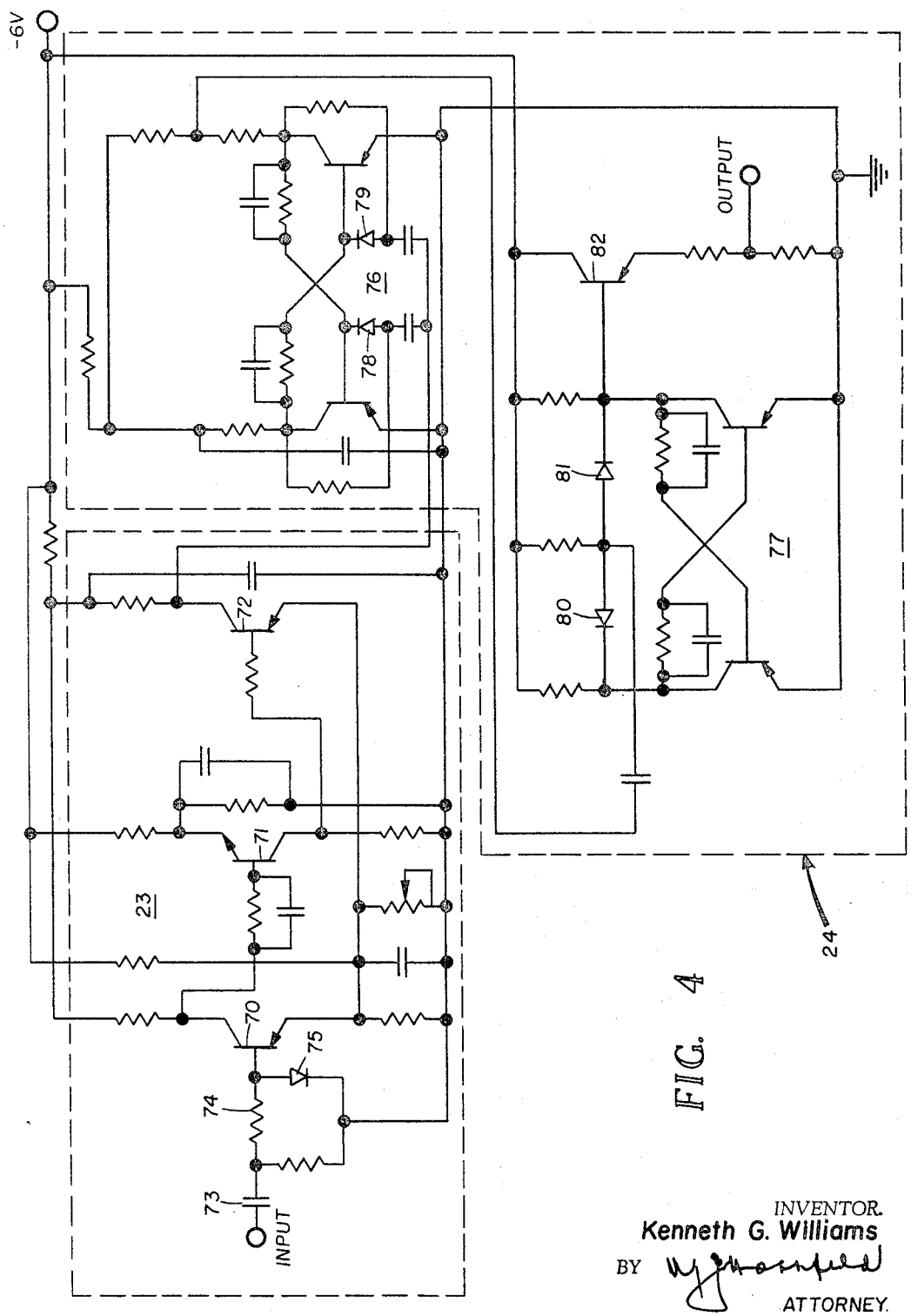
FIG. 4 is a circuit diagram showing a typical clipper and threshold amplifier and two stages of the binary counter.

FIGURE 4 illustrates circuit diagram of the clipper and threshold amplifier 23 and an abridged circuit diagram of the binary counter 24. The output signals from the polarity coincidence detector 17 generally consists of complete 0.5 microsecond negative pulses from the 1 megacycle clock oscillator randomly grouped or spaced. Occasionally partial pulses appear however. This is due to the random nature of the input signals, so that there will be times when coincidence occurs for intervals of short time as short as a few nanoseconds. The amplitudes of these undesired spikes depend on the duration coincidence as well as the finite rise and fall times of the detector circuitry. All the spikes will not operate a flip-flop counter directly, only those of sufficient amplitude will trip the counter. Also if a single signal from one of the coincidence detectors is fed as a common input signal to two flip-flop counters, the two parallel counters will not count identically. This results from the fact that the two input stages will not be identical due to component tolerances and transistor differences. The more sensitive circuit will thus count smaller pulses than the less sensitive input and produce a slightly larger count at the output than the other. This difficulty is largely overcome by the introduction of a clipper and threshold amplifier 23 ahead of the input stage of each counter. This amplifier contains three stages composed of transistors 70, 71 and 72. Its action tends to introduce a threshold level for the output signals from the coincidence detector and amplify only the spikes which exceed this to full amplitude. All full pulses of course pass through with no change. There will, of course, still be a narrow slice of amplitudes which still pass through with intermediate amplitudes. The number of these, however, is reduced by roughly the gain built into the threshold amplifier. The amplifier therefore reduces markably the number of spurious spikes and reduces the error between counters for identical signals to a negligible value. The effect is equivalent to what might have been obtained by the more difficult alternative of using a 10 megacycle clock oscillator, and extra binary counter stages capable of accepting 10 megacycle pulses to count down the extra factor of 10 in increased number of pulses.

A more detailed explanation of the clipper and threshold amplifier 23 operation will now be given. The input signal, consisting mostly of negative 1 megacycle pulses and scattered negative spikes, will be differentiated by the input capacitor 73 and resistance 74. Negative and positive spikes will result from the differentiation but only the negative ones will appear at the base since the positive ones will be eliminated by the diode 75. The three stages consisting consecutively of a PNP transistor 70, and NPN transistor 71, and a PNP transistor 72 are normally biased beyond cut-off when no signal is present at the input. Small negative spikes which are not large enough to cause the first stage to conduct will be eliminated in the first stage and never appear in the output of the amplifier. Negative spikes which are slightly larger than required for conduction in the input stage will be amplified enough to cause saturation in the third stage, thus producing a clipping action following the threshold elimination. The net result is a production of an improved digital signal having less amplitude variation and being more suitable for driving input counter stage. Since there are an uneven number of stages of amplification, the output signal will consist of a sequence of positive going pulses.

The counter itself consists of 17 stages of flip-flops in cascade. The first six stages are high frequency flip-flops 76 capable of counting at a rate of 10 megacycles. The following 11 stages are simpler, low frequency flip-flop 77 capable of counting at a 100 kc. rate. Only one of each of these stages is shown in FIGURE 4. The configuration and two types of flip-flops are similar, differing only in the arrangement and complexity of the steering diodes 78–81. The purpose of these is to cause the flip-flops to change from one stable state to the other only at the occurrence of positive pulses. This results in a binary count of two since the flip-flop produces a single positive output pulse for every two positive input pulses. The diodes are connected to the collectors in both styles of flip-flops in such a manner so that one diode is biased near cut-off while the other is biased several volts beyond cut-off. The polarity of the diode prevents negative pulses from reaching either base of the flip-flop, while the bias directs positive pulses to the proper base of the flip-flop to change its state. An emitter follower 82 is employed as an output stage for the binary counter for oscillation purposes. The base of this transistor is connected to the output of the proper counter stage to obtain the desired integration time.

The circuit of the invention shown in block diagram in FIGURE 1 has particular application in separating a signal from noise in a system wherein the signal to noise ratio is low. The signal to be detected together with the accompanying background noise is applied to the input terminal 12. A signal of the same frequency as the unknown signal is applied to both terminals 11 and 13. The difference between the signal applied between the terminal 11 and the signal applied to terminal 13 is the time displacement or time delay from the unknown signal applied to terminal 12. If the signal applied to the terminals 11 and 13 is in fact of the same frequency as that applied to terminal 12 and is equally timed displaced about the signal on terminal 12, then a periodic sampling of the signal from terminal 12 with that of either terminal 11 or 13 will produce equal coincidence. Equal coincidence between the signals will produce equal number of output pulses from the binary counters.

If the unknown signal is not of the same frequency as the reference signal and also equally time displaced from the reference signal applied to terminals 11 and 13, then the coincidence of one will be greater than the coincidence of the other. Periodic sampling of the polarity coincidence will indicate a difference of the coincidence rate. Since the binary counters count the coincidence pulses, the channel having the greater coincidence rate will produce more output pulses than the other channel. This greater output is detected by circuitry, not shown in this application, which will alter the frequency of the reference signal applied to the input terminals 11 and 13. Thus the circuit of FIGURE 1 is utilized in a closed loop or lock-in system to control a variable frequency oscillator in order to detect a signal having a low signal-to-noise ratio.

The periodic sampling by the oscillator in the polarity coincidence detector of the polarity of the input signals effectively eliminates the need for elaborate circuits to perform multiplication. The use of the binary counter to accumulate the samples over a period of time effectively performs a digital integration based upon the sampling rate. This digital integration eliminates the need from converting from a digital-to-analog and back from an analog-to-digital format in the operation of the closed loop-system.

Other modifications will suggest themselves to persons skilled in the art. The invention, therefore, is not to be limited except as defined in the appended claims.

What is claimed is:

1. A digital correlator comprising:
   first, second and third analog voltage input means each for respectively receiving, clipping and shaping first, second and third analog voltage signals to form substantially first, second and third square wave signals having a polarity identical to said first, second and third analog voltage signals, said first signal being delayed in time relative to said third signal and said second signal being advanced in time relative to said third signal;
   first sampling means connected to said first and third input means for periodically comparing the polarity of the first and third square wave signals and for producing output pulses upon polarity coincidence;
   second sampling means connected to said second and third input means for periodically comparing the polarity of the second and third square wave signals and for producing output pulses upon polarity coincidence;
   first counting means connected to receive the output of said first sampling means for accumulating over a period of time a count of said output pulses of said first sampling means whereby the correlation between said first and third analog voltage signals is obtained; and
   second counting means connected to receive the output of said second sampling means for accumulating over a period of time a count of said output pulses of said second sampling means whereby the correlation between said second and third analog voltage signals is obtained.

2. A digital correlator as in claim 1 wherein said first and second analog voltage signals are pseudo-random signals and wherein said third analog voltage signal is a detected signal having a low signal-to-noise ratio.

3. A digital correlator as in claim 1 wherein said first and second sampling means are polarity coincidence detectors each of which comprises a pair of AND gates and an OR gate, the output of said AND gates being applied to the input of said OR gate.

4. A digital correlator as in claim 1 wherein said first and second counter means are binary counters.

5. A digital correlator as in claim 1 further including a high frequency oscillator connected to the input of said first and second sampling means for applying clock pulses thereto.

References Cited

UNITED STATES PATENTS

| 3,036,775 | 5/1962 | McDermid et al. | 235—181 XR |
| 3,167,738 | 1/1965 | Westerfield | 340—3 |
| 3,182,292 | 5/1965 | Schmid | 340—170 |
| 3,268,860 | 8/1966 | Wischmeyer | 340—15.5 |
| 3,284,763 | 11/1966 | Burg et al. | 340—15.5 |
| 3,321,740 | 5/1967 | Lee | 340—15.5 |

OTHER REFERENCES

Richards: Digital Computer Components and Circuits, 1957, D. Van Nostrand Company. U.S. Patent Office Scientific Library, Call numbers: TK/7888.3/R5d, pp. 111–116 relied on.

MALCOLM A. MORRISON, *Primary Examiner.*

M. P. HARTMAN, *Assistant Examiner.*